US012555913B2

(12) United States Patent
Lin et al.

(10) Patent No.: US 12,555,913 B2
(45) Date of Patent: Feb. 17, 2026

(54) LIQUID CRYSTAL ANTENNA

(71) Applicant: NATIONAL SUN YAT-SEN UNIVERSITY, Kaohsiung (TW)

(72) Inventors: Tsung-Hsien Lin, Kaohsiung (TW); Tien-Lun Ting, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 93 days.

(21) Appl. No.: 18/804,158

(22) Filed: Aug. 14, 2024

(65) Prior Publication Data

US 2025/0364723 A1 Nov. 27, 2025

(30) Foreign Application Priority Data

May 24, 2024 (TW) ................................ 113119298

(51) Int. Cl.
*H01Q 3/44* (2006.01)
*H01Q 9/06* (2006.01)

(52) U.S. Cl.
CPC ............... *H01Q 9/065* (2013.01); *H01Q 3/44* (2013.01)

(58) Field of Classification Search
CPC ................................. H01Q 3/44; H01Q 9/065
See application file for complete search history.

(56) References Cited

U.S. PATENT DOCUMENTS 12,388,186 B2 * 8/2025 Zhang ................ H01Q 15/0006

FOREIGN PATENT DOCUMENTS

WO WO-2025091290 A1 * 5/2025 ............. H01Q 21/00

* cited by examiner

*Primary Examiner* — Daniel Munoz
(74) *Attorney, Agent, or Firm* — WPAT, PC

(57) ABSTRACT

A liquid crystal antenna includes an upper substrate, a lower substrate, a liquid crystal layer, a first metal layer, and a second metal layer. The liquid crystal layer is disposed between the two substrates. The first metal layer is located between the lower substrate and the liquid crystal layer, and includes two opposite differential signal lines electrically connected to two electrode wires, respectively. The two differential signal lines and the two electrode wires form a mirror symmetry with a virtual ground line being an axis of symmetry. The second metal layer is located between the upper substrate and the liquid crystal layer, and includes a plurality of line segments arranged at intervals. Vertical projections of the line segments overlap with the two differential signal lines. The second metal layer forms a mirror symmetry with a virtual symmetry plane including the virtual ground line and perpendicular to the two substrates.

9 Claims, 5 Drawing Sheets

LIQUID CRYSTAL ANTENNA

CROSS REFERENCE TO RELATED APPLICATION

The application claims the benefit of Taiwan application serial No. 113119298, filed on May 24, 2024, and the entire contents of which are incorporated herein by reference.

BACKGROUND OF THE INVENTION

1. Field of the Invention

The present invention relates to a photoelectric communication element and, more particularly, to a liquid crystal antenna with stable signal transmission and reduced energy loss.

2. Description of the Related Art

The conventional antenna controls a phase relationship between a plurality of individual antenna elements by forming a phase array, and superimposes a plurality of radio waves having phase differences radiated by the plurality of antenna elements to form an output beam, so as to control the directions of radio waves without moving the antenna. The plurality of antenna elements receives radio frequency signals provided by a transmitter, and changes phases or delays of the signals through respective phase shifters. The variation of each phase shifter is controlled through a calculation module, so that a plane wave formed by wave fronts of all radiated radio waves propagates in a specific direction.

The conventional liquid crystal antenna uses a liquid crystal unit as a phase shifter, which has the advantages such as small volume, low cost, and good operability. Since liquid crystal is dielectric and can control the steering of liquid crystal molecules of the liquid crystal unit through an external electric field, a voltage can be applied to the liquid crystal unit to change a magnitude of equivalent capacitance or equivalent inductance thereof. Thus, the radio frequency signal inputted to each liquid crystal unit has different transmission speeds and forms radio waves with different phase shifts. However, a change in the phase shift that can be achieved by a single liquid crystal unit is limited. To increase a controllable range of the phase shift in which a single antenna element may be adjusted, liquid crystal materials with great dielectric anisotropy need to be used, the liquid crystal layer needs to be thickened, or a plurality of liquid crystal phase shifters need to be superimposed. However, in addition to technical difficulties in the manufacturing process and materials, problems such as increased antenna volume, additional energy loss, and the difficulty in precision control also arise.

In view of this, it is necessary to improve the conventional liquid crystal antenna.

SUMMARY OF THE INVENTION

To solve the above problems, it is an objective of the present invention to provide a liquid crystal antenna, which can reduce energy loss during signal transmission.

It is another objective of the present invention to provide a liquid crystal antenna, which can improve the quality of antenna communication.

It is yet another objective of the present invention to provide a liquid crystal antenna, which can simplify the structure of an antenna to save manufacturing cost.

As used herein, the term “a”, “an” or “one” for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

A liquid crystal antenna of the present invention includes an upper substrate, a lower substrate, a liquid crystal layer, a first metal layer, and a second metal layer. The liquid crystal layer is located between the two substrates. The first metal layer is located between the lower substrate and the liquid crystal layer. The first metal layer includes two opposite differential signal lines, with the two differential signal lines electrically connected to two electrode wires, respectively. The two differential signal lines have two parallel lines, with a virtual ground line located between the two parallel lines. The two differential signal lines and the two electrode wires form a mirror symmetry with the virtual ground line being an axis of symmetry. The second metal layer is located between the upper substrate and the liquid crystal layer. The second metal layer includes a plurality of line segments arranged at intervals, with vertical projections of the plurality of line segments overlapped with the two differential signal lines of the first metal layer. A virtual symmetry plane includes the virtual ground line and is perpendicular to the upper substrate and the lower substrate. The second metal layer forms a mirror symmetry on two sides of the virtual symmetry plane.

Accordingly, in the liquid crystal antenna of the present invention, an electromagnetic field generated through a mirror symmetry structure of the differential signal lines and the electrode wires is evenly distributed and symmetrically balanced, so that energy loss during phase shifting of the liquid crystal may be reduced, and noise interference may further be reduced to improve signal stability and communication quality. In addition, through controlling the structural symmetry of the antenna, it can also be ensured that products of the same specification can be manufactured repeatedly. In this way, effects of improving the transmission efficiency of the liquid crystal antenna, reducing device energy consumption and maintenance requirements, and reducing manufacturing and installation costs can be achieved.

In an example, the two electrode wires provide electrical signals with a same amplitude and opposite phases. Thus, the two electrode wires may cause the two differential signal lines to generate signals with opposite waveforms, and then cancel out noise through signal subtraction, thereby reducing noise interference.

In an example, a capacitive element is formed in each overlapping region of the vertical projection of each of the plurality of line segments of the second metal layer with the first metal layer, and an inductive element is formed in each blank region in which the vertical projection of the plurality of line segments of the second metal layer does not overlap with the first metal layer. Thus, a change in an electrical characteristic of an equivalent circuit may be controlled by applying a voltage to the liquid crystal layer, thereby operating an antenna output.

In an example, the first metal layer includes a transceiving section, a matching section, and a phasing section, with the vertical projections of the plurality of line segments of the second metal layer overlapped with the matching section and the phasing section. Thus, the transceiving section may receive and transmit a signal, the matching section may be configured to control a circuit impedance, and the phasing section may adjust a phase shift of the signal, thereby optimizing a transmission signal of the antenna.

In an example, each two adjacent line segments of the second metal layer corresponding to the phasing section have an identical first interval, and adjacent line segments of the second metal layer corresponding to the matching section have at least a second interval and a third interval, with the third interval different from the second interval. Thus, gradually increased or decreased impedance may be formed to avoid oscillation and reflection of a standing wave caused by a drastic change of the impedance, thereby reducing signal energy loss.

In an example, the third interval is greater than the second interval, and the second interval is greater than the first interval. Thus, the intervals among the plurality of line segments of the second metal layer gradually changes, so that the circuit impedance and reflection coefficients may be controlled, thereby avoiding the standing wave and signal reflection.

In an example, the first metal layer and the second metal layer are made of metal materials with high electrical conductivity, and a thickness of each of the first metal layer and the second metal layer is greater than or equal to 1 micrometer. Thus, the first metal layer and the second metal layer may apply an electric field to the liquid crystal material, may be used as electrode layers of the capacitive element and the inductive element, thereby enabling switching of magnitudes of capacitance and inductance.

In an example, the two electrode wires have a same material and a same size, and a width of each of the two electrode wires is less than 100 micrometers. Thus, the two electrode wires may form a balanced structure having opposite electrical characteristics, thereby maintaining symmetrical configuration and stabilizing signals.

In an example, the liquid crystal antenna of the present invention further includes a metal reflecting layer disposed between the first metal layer and the lower substrate. Thus, a reflective liquid crystal phase shifter may be formed to reduce signal energy loss and stabilize signal frequency, thereby reducing energy consumption and improving antenna efficiency.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
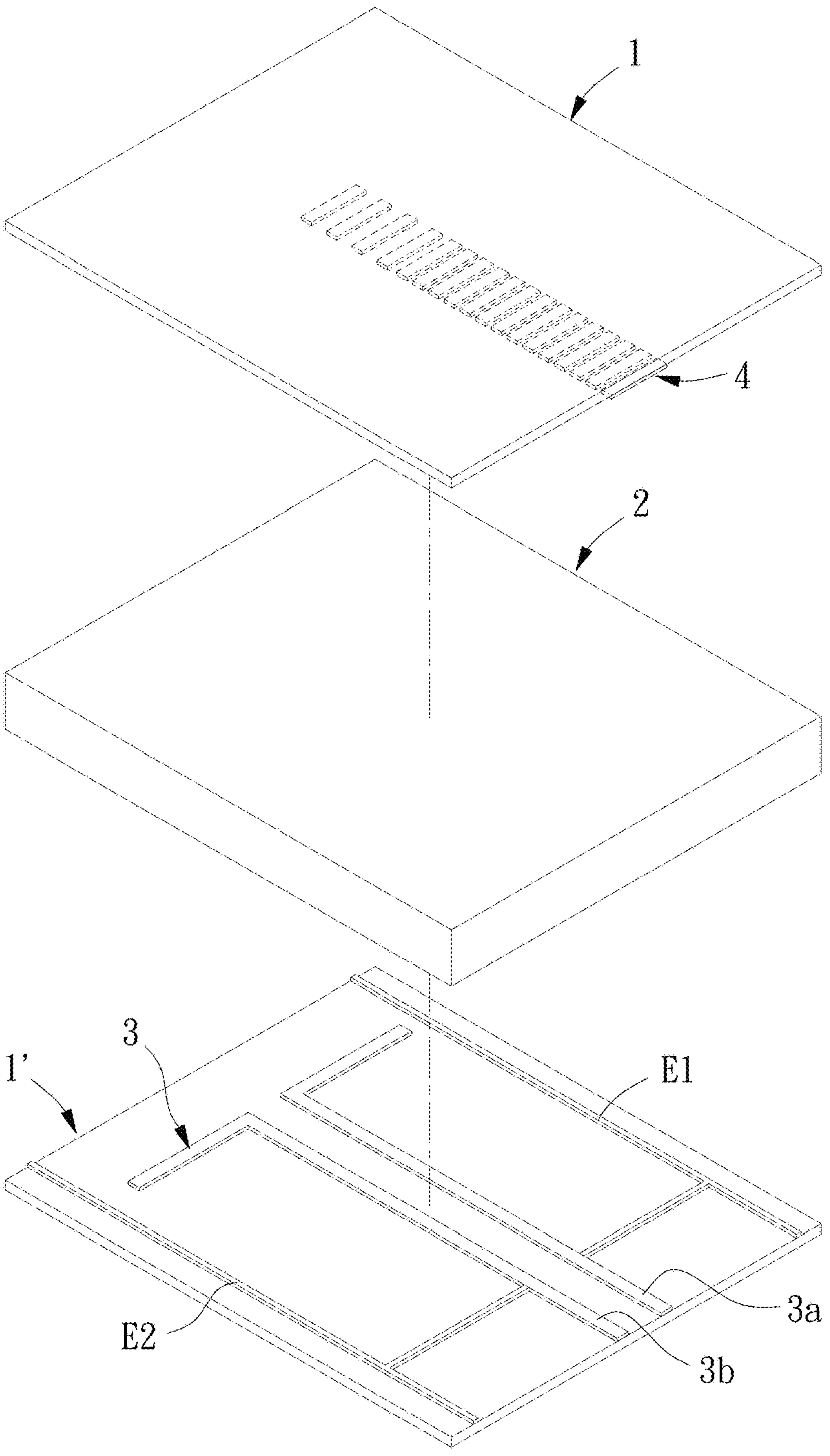
FIG. 1 is an exploded perspective view of a preferred embodiment according to the present invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Figure 2:
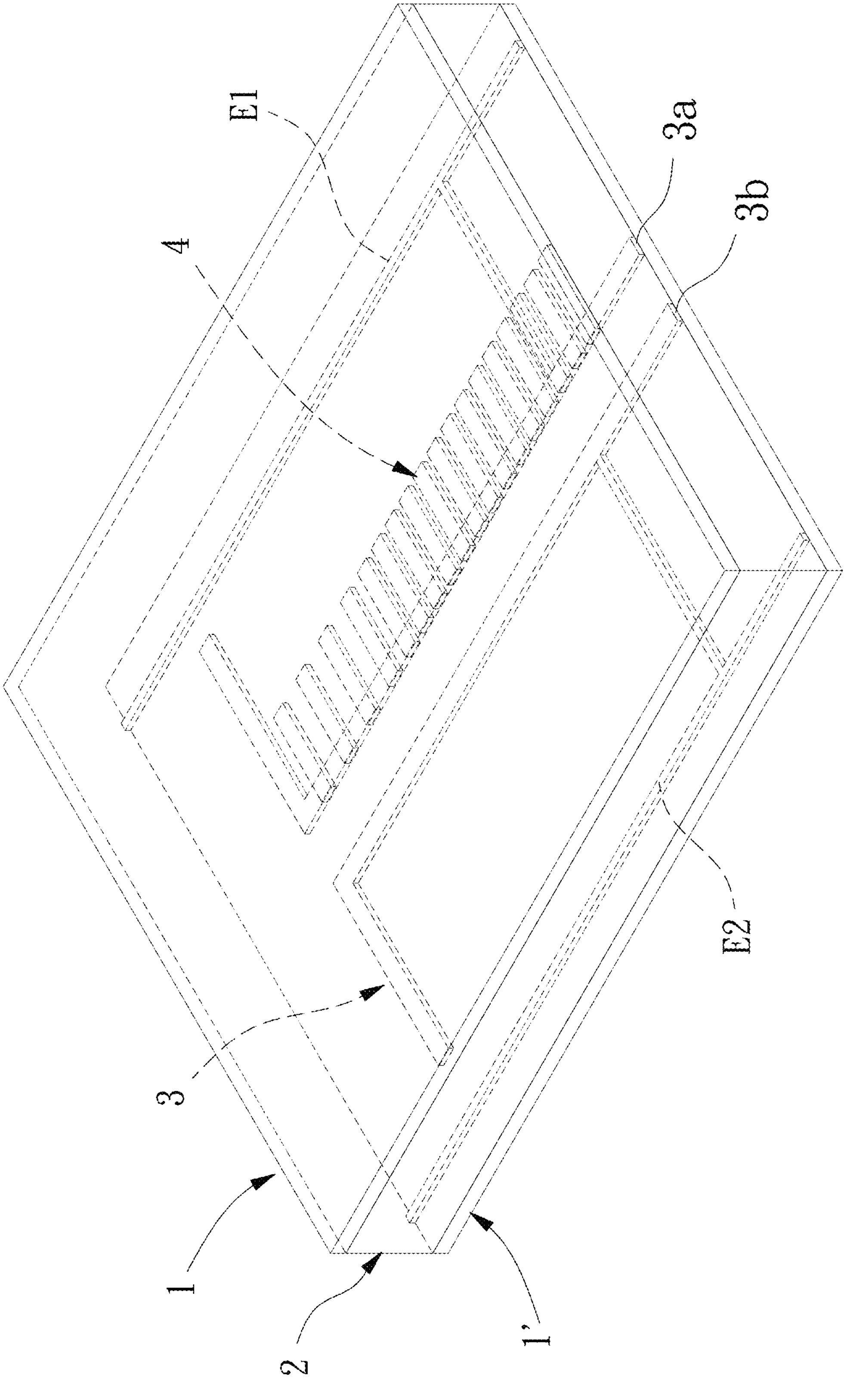
FIG. 2 is a perspective view of a preferred embodiment according to the present invention.

Referring to FIGS. 1 and 2, FIGS. 1 and 2 show a preferred embodiment of a liquid crystal antenna according to the present invention. The liquid crystal antenna includes an upper substrate 1, a lower substrate 1', a liquid crystal layer 2, a first metal layer 3, and a second metal layer 4. The upper substrate 1 and the lower substrate 1' are spaced from and parallel to each other. The liquid crystal layer 2 is disposed between the upper substrate 1 and the lower substrate 1'. The first metal layer 3 and the second metal layer 4 are located on inner surfaces of the upper substrate 1 and the lower substrate 1', respectively. An upper surface and a lower surface of the liquid crystal layer 2 respectively contact with the second metal layer 4 and the first metal layer 3.

An accommodating space is formed between the upper substrate 1 and the lower substrate 1'. Each of the upper substrate 1 and the lower substrate 1' may be made of a hermetic material, such as glass, acrylic, or plastic, to seal a fluid substance in the accommodating space. The upper substrate 1 and the lower substrate 1' may further serve as a radome to protect an antenna and a circuit thereof and permit a radio wave from the antenna to penetrate through the upper substrate 1 and the lower substrate 1'. Each of the upper substrate 1 and the lower substrate 1' is preferably in a uniform and smooth shape.

The liquid crystal layer 2 is formed by filling the accommodating space with a liquid crystal material. The liquid crystal material may be a nematic liquid crystal, whose dielectric anisotropy may be positive ($\Delta\varepsilon>0$) or negative ($\Delta\varepsilon<0$). The present invention is not limited in this regard. When an external electric field acts on the liquid crystal layer 2, the molecular arrangement of the liquid crystal material deviates, resulting in a change in the dielectric constant of the liquid crystal material. Electrical characteristics (such as capacitance and inductance) of an equivalent circuit composed of the liquid crystal layer 2 may be controlled accordingly, and then the liquid crystal layer 2 can be used as a phase shifter of the antenna.

By forming the first metal layer 3 and the second metal layer 4 on the opposite inner surfaces of the upper substrate 1 and the lower substrate 1', and injecting the liquid crystal layer 2 between the upper substrate 1 and the lower substrate 1', the first metal layer 3 may be located between the lower substrate 1' and the liquid crystal layer 2, and the second metal layer 4 may be located between the upper substrate 1 and the liquid crystal layer 2. In this way, circuit patterns of the first metal layer 3 and the second metal layer 4 are distributed on the lower surface and the upper surface of the liquid crystal layer 2, respectively. The first metal layer 3 and the second metal layer 4 are preferably made of metal materials with high electrical conductivity, such as silver, copper, gold, and aluminum. A thickness of each of the first metal layer 3 and the second metal layer 4 is greater than or equal to 1 micrometer.

Figure 3:
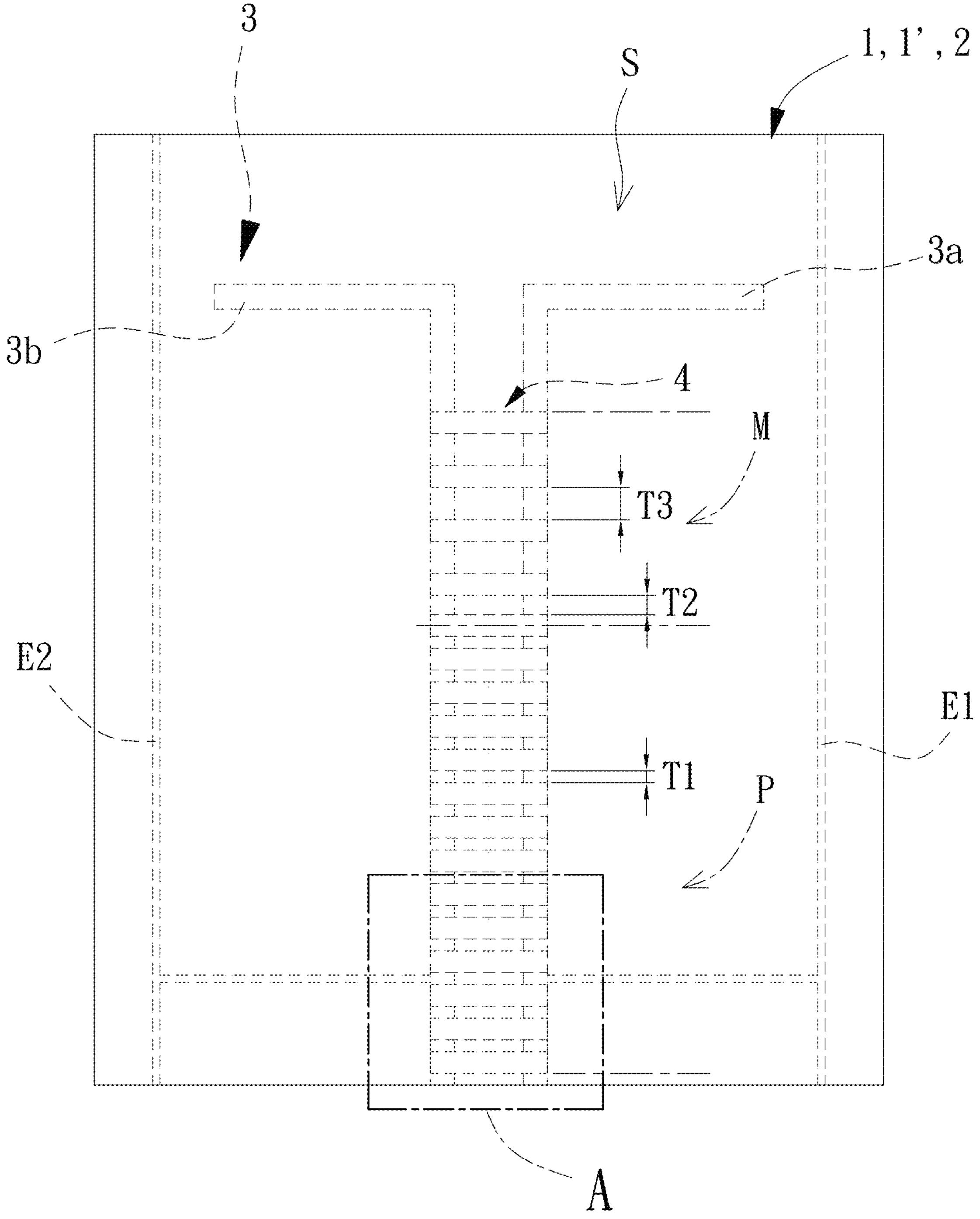
FIG. 3 is a top view of a preferred embodiment according to the present invention.
Figure 4:
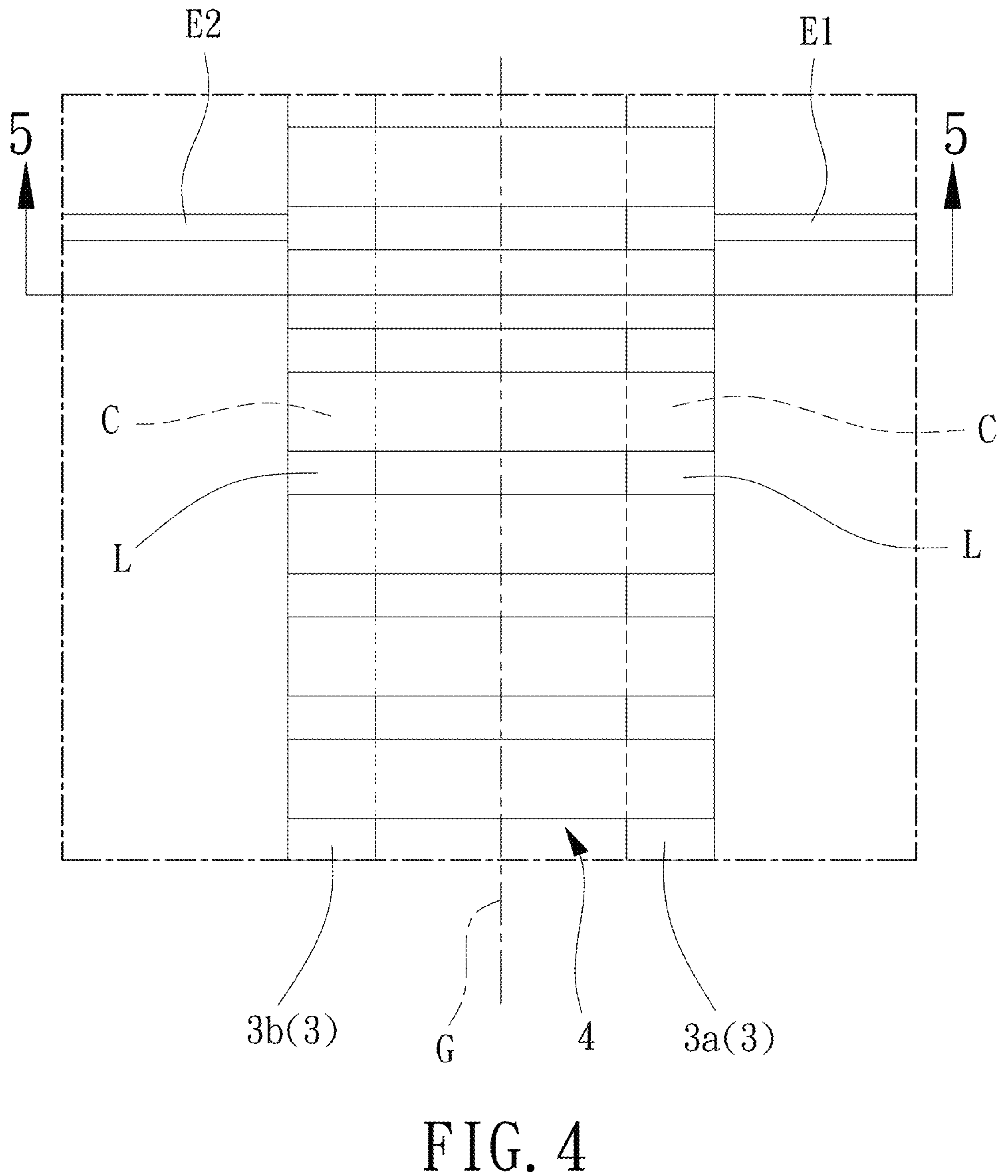
FIG. 4 is an enlarged view of a local structure of the region A shown in FIG. 3.
Figure 5:
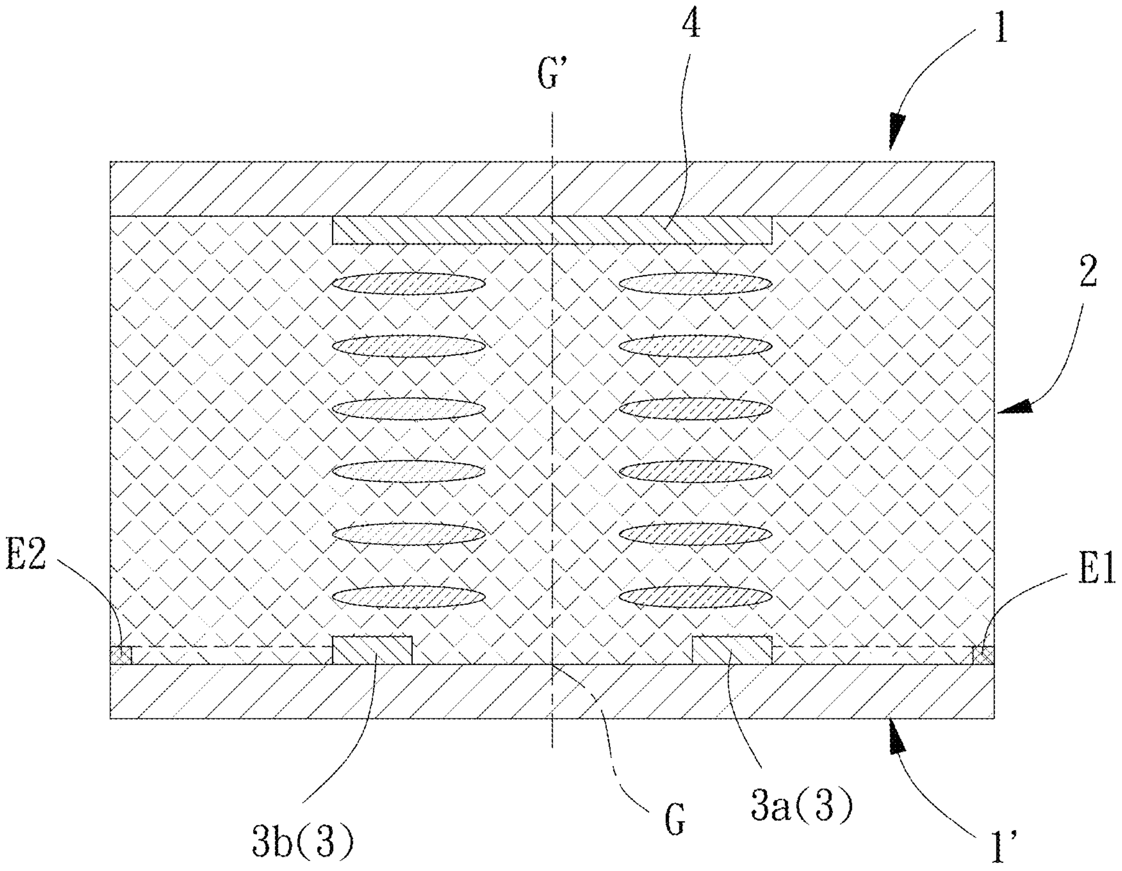
FIG. 5 is a cross-sectional view taken along line 5-5 in FIG. 4.

Referring to FIGS. 3 to 5, the first metal layer 3 may include two opposite differential signal lines 3*a* and 3*b*. The two differential signal lines 3*a* and 3*b* are electrically connected to two electrode wires E1 and E2, respectively. The two electrode wires E1 and E2 preferably have a same material and a same size to provide a same electrical conductivity. Electrical signals provided through the two electrode wires E1 and E2 have the same amplitude and opposite phases. Specifically, when one of the electrode wires E1 is at a positive potential, the other electrode wire E2 is at a negative potential, and vice versa. Furthermore, the first metal layer 3 may be divided into a transceiving section S, a matching section M, and a phasing section P based on their respective functions. The matching section M and the phasing section P of the two differential signal lines 3*a* and 3*b* may be in a form of two parallel lines. In addition, a virtual ground line G is located between the two parallel lines. The two differential signal lines 3*a* and 3*b* (including the transceiving section S, the matching section M, and the phasing section P) and the two electrode wires E1 and E2 form a mirror symmetry that has a balanced structure with the virtual ground line G being the axis of symmetry. A width of each of the two electrode wires E1 and E2 is preferably less than 100 micrometers. The transceiving section S may be a pair of dipole antennas with the virtual ground line G as the axis of symmetry.

The second metal layer 4 may be located above the matching section M and the phasing section P of the first metal layer 3. The circuit pattern of the second metal layer 4 may be a plurality of line segments arranged at intervals, and a vertical projection of each of the plurality of line segments on the lower substrate 1' is overlapped with the two parallel lines of the first metal layer 3. Overlapped regions of the vertical projections of the plurality of line segments of the second metal layer 4 with the first metal layer 3 may apply an electric field to the liquid crystal layer 2 therebetween, forming adjustable liquid crystal capacitive elements C. Inductive elements L may be formed in blank regions in which the vertical projection of the plurality of line segments of the second metal layer 4 does not overlap with the first metal layer 3. Moreover, areas and lengths of the overlapped regions and the blank regions, a distance between the two differential signal lines 3*a* and 3*b*, and a magnitude of the applied electric field are related to the electrical characteristics of the capacitive elements C and the inductive elements L. In addition, a virtual symmetry plane G' includes the virtual ground line G and is perpendicular to the upper substrate 1 and the lower substrate 1'. The second metal layer 4 forms a mirror symmetry on two sides of the virtual symmetry plane G'.

The plurality of line segments of the second metal layer 4 may have a same shape, a same length, and a same width. Each two adjacent line segments of the second metal layer 4 above the phasing section P may have an identical interval, and adjacent line segments of the second metal layer 4 above the matching section M may have at least two different intervals. In this embodiment, the line segments of the second metal layer 4 above the phasing section P have a first interval T1, and the line segments of the second metal layer 4 above the matching section M have a second interval T2 and a third interval T3, where the third interval T3 is greater than the second interval T2, and the second interval T2 is greater than the first interval T1. A gradually increased or decreased impedance may be formed in the matching section M through changing the interval between the adjacent line segments of the second metal layer 4, thereby avoiding signal energy loss caused by drastic change of the impedance.

Moreover, the liquid crystal antenna of the present invention may further include a metal reflecting layer (not shown). The metal reflecting layer may be disposed below the first metal layer 3, and between the first metal layer 3 and the lower substrate 1. Thus, a reflective liquid crystal phase shifter can be formed for reducing signal energy loss and stabilizing signal frequency.

Based on the above, in the liquid crystal antenna of the present invention, an electromagnetic field generated through a mirror symmetry structure of the differential signal lines and the electrode wires is evenly distributed and symmetrically balanced, so that energy loss during phase shifting of the liquid crystal may be reduced, and noise interference may further be reduced to improve signal stability and communication quality. In addition, through controlling the structural symmetry of the antenna, it can also be ensured that products of the same specification can be manufactured repeatedly. In this way, effects of improving the transmission efficiency of the liquid crystal antenna, reducing device energy consumption and maintenance requirements, and reducing manufacturing and installation costs can be achieved.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:

1. A liquid crystal antenna, comprising:

an upper substrate and a lower substrate;

a liquid crystal layer disposed between the upper substrate and the lower substrate;

a first metal layer located between the lower substrate and the liquid crystal layer, wherein the first metal layer includes two opposite differential signal lines, with the two differential signal lines electrically connected to two electrode wires, respectively, wherein the two differential signal lines have two parallel lines, with a virtual ground line located between the two parallel lines, and wherein the two differential signal lines and the two electrode wires form a mirror symmetry with the virtual ground line being an axis of symmetry; and a second metal layer located between the upper substrate and the liquid crystal layer, wherein the second metal layer includes a plurality of line segments arranged at intervals, with vertical projections of the plurality of line segments overlapped with the two differential signal lines of the first metal layer, and wherein a virtual symmetry plane includes the virtual ground line and is perpendicular to the upper substrate and the lower substrate, and the second metal layer forms a mirror symmetry on two sides of the virtual symmetry plane.

2. The liquid crystal antenna as claimed in claim 1, wherein the two electrode wires provide electrical signals with a same amplitude and opposite phases.

3. The liquid crystal antenna as claimed in claim 1, wherein a capacitive element is formed in each overlapping region of the vertical projection of each of the plurality of line segments of the second metal layer with the first metal layer, and an inductive element is formed in each blank region in which the vertical projection of the plurality of line segments of the second metal layer does not overlap with the first metal layer.

4. The liquid crystal antenna as claimed in claim 1, wherein the first metal layer includes a transceiving section, a matching section, and a phasing section, and wherein the vertical projections of the plurality of line segments of the second metal layer are overlapped with the matching section and the phasing section.

5. The liquid crystal antenna as claimed in claim 4, wherein each two adjacent line segments of the second metal layer corresponding to the phasing section have an identical first interval, and adjacent line segments of the second metal layer corresponding to the matching section have at least a second interval and a third interval, with the third interval different from the second interval.

6. The liquid crystal antenna as claimed in claim 5, wherein the third interval is greater than the second interval, and the second interval is greater than the first interval.

7. The liquid crystal antenna as claimed in claim 1, wherein the first metal layer and the second metal layer are made of metal materials with high electrical conductivity, and a thickness of each of the first metal layer and the second metal layer is greater than or equal to 1 micrometer.

8. The liquid crystal antenna as claimed in claim 1, wherein the two electrode wires have a same material and a same size, and a width of each of the two electrode wires is less than 100 micrometers.

9. The liquid crystal antenna as claimed in claim 1, further comprising a metal reflecting layer disposed between the first metal layer and the lower substrate.

* * * * *